US009877099B2

(12) United States Patent
Donaldson

(10) Patent No.: US 9,877,099 B2
(45) Date of Patent: Jan. 23, 2018

(54) MEDIA/COMMUNICATIONS SYSTEM

(71) Applicant: SOUNDCHIP SA, Bussigny-pres-Lausanne (CH)

(72) Inventor: Mark Donaldson, Bussigny-pres-Lausanne (CH)

(73) Assignee: SOUNDCHIP SA, Bussigny-pres-Lausanne (CH)

( * ) Notice: Subject to any disclaimer, the term of this patent is extended or adjusted under 35 U.S.C. 154(b) by 364 days.

(21) Appl. No.: 14/799,858

(22) Filed: Jul. 15, 2015

(65) Prior Publication Data

US 2016/0021158 A1 Jan. 21, 2016

(30) Foreign Application Priority Data

Jul. 15, 2014 (GB) .................................. 1412564.5

(51) Int. Cl.
*H04L 29/06* (2006.01)
*H04L 29/08* (2006.01)
*G06F 1/32* (2006.01)
*H04N 7/18* (2006.01)
*H04N 7/173* (2011.01)
*H04R 1/10* (2006.01)

(52) U.S. Cl.
CPC ....... *H04R 1/1041* (2013.01); *H04R 2420/05* (2013.01); *H04R 2420/09* (2013.01)

(58) Field of Classification Search
CPC ......... H04N 21/64322; H04N 21/4131; H04N 21/632; H04L 12/16; H04L 67/306; H04L 67/06; H04R 1/1041
See application file for complete search history.

(56) References Cited

U.S. PATENT DOCUMENTS 8,495,236 B1 * 7/2013 Glasser ............. H04L 29/08522 709/203
2004/0063459 A1 4/2004 Yamashita et al.
(Continued)

FOREIGN PATENT DOCUMENTS

WO 2013143971 A2 10/2013

OTHER PUBLICATIONS

U.K. Search Report in co-pending U.K. Application No. GB1512087.6, dated Dec. 24, 2015, 3 pages.

*Primary Examiner* — Kevin Bates
*Assistant Examiner* — Mark A Scott
(74) *Attorney, Agent, or Firm* — Lempia Summerfield Katz LLC

(57) ABSTRACT

A system provides media content/communications data to a plurality of devices. The system includes a server system that includes a central server in communication with a plurality of local units each acting as a client to the central server. The central server is configured to provide content to each local unit. The system includes at least one earphone device linkable to each local unit to convert an audio signal received from the server system into an audible sound output to a user. The system is configured to identify a potential unlinking of an earphone device from an output of a local unit, store user-specific data corresponding to a condition of operation of the local unit substantially at the time of the potential unlinking, identify an attempt to link the earphone device with an output of a local unit, and retrieve the stored user-specific data.

25 Claims, 5 Drawing Sheets

(56) References Cited

U.S. PATENT DOCUMENTS

| | | | | |
|---|---|---|---|---|
| 2005/0278754 | A1* | 12/2005 | Bleacher | A63F 13/12 725/77 |
| 2006/0045294 | A1* | 3/2006 | Smyth | H04S 7/304 381/309 |
| 2006/0143662 | A1* | 6/2006 | Easterling | H04N 5/50 725/76 |
| 2006/0270373 | A1* | 11/2006 | So | H04B 1/205 455/306 |
| 2006/0285677 | A1* | 12/2006 | Souma | H04M 1/6058 379/388.03 |
| 2007/0232255 | A1* | 10/2007 | Masuda | H04B 1/385 455/343.1 |
| 2007/0250873 | A1* | 10/2007 | Ohyama | H04L 29/06027 725/82 |
| 2008/0120330 | A1* | 5/2008 | Reed | G06F 17/30 |
| 2008/0312778 | A1* | 12/2008 | Correa | H04H 20/62 701/3 |
| 2009/0007194 | A1* | 1/2009 | Brady, Jr. | H04N 7/10 725/77 |
| 2009/0077594 | A1* | 3/2009 | Milosevski | H04L 67/06 725/76 |
| 2009/0081999 | A1* | 3/2009 | Khasawneh | H04M 3/56 455/416 |
| 2009/0323975 | A1* | 12/2009 | Groesch | H04R 1/1091 381/71.1 |
| 2010/0115149 | A1* | 5/2010 | Ewer | H04M 1/6066 710/19 |
| 2010/0182977 | A1* | 7/2010 | Watanabe | H04N 5/4401 370/331 |
| 2010/0235866 | A1* | 9/2010 | Jangid | H04N 7/17336 725/76 |
| 2012/0050191 | A1* | 3/2012 | Higashida | H04B 10/278 345/173 |
| 2013/0005303 | A1* | 1/2013 | Song | A61B 5/02438 455/411 |
| 2013/0063612 | A1* | 3/2013 | Royster | H04N 21/2146 348/207.99 |
| 2014/0067208 | A1* | 3/2014 | Klappert | H04N 21/4131 701/49 |
| 2015/0017915 | A1* | 1/2015 | Hennequin | G08C 17/02 455/41.2 |
| 2016/0062327 | A1* | 3/2016 | Fagan | B64D 11/00153 700/83 |

* cited by examiner

MEDIA/COMMUNICATIONS SYSTEM

This application claims the benefit of GB 1412564.5, filed on Jul. 15, 2014, which is hereby incorporated by reference in its entirety.

FIELD

The disclosed embodiments relate to a system and method for providing media and/or communications data to a plurality of devices, and particularly but not exclusively to an In-Flight Entertainment and Communications (IFEC) system.

BACKGROUND

IFEC systems providing on-demand media and in-flight connectively are well known in the art with audio being supplied to passengers by headphones connected via a Remote Jack Unit (RJU) or "Jack Module" typically installed in the armrest of an aircraft seat.

The applicant's earlier published application WO 2013/143971 discloses an advanced IFEC system in which the headphones used to provide audio to the passengers each include a processor module for allowing two-way digital communication with a server system providing audio/control data. Each headphone is associated with a unique identifier for allowing the server system to direct communications (e.g. including audio and control data) to a selected one of the plurality headphones connected to the server system.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the disclosed embodiments may provide an IFEC system with further enhanced user flexibility.

In accordance with a first aspect, there is provided a system (e.g. in-flight entertainment system) for providing media content/communications data to a plurality of devices, the system including: a server system including a central server in communication with a plurality of local units each acting as a client to the central server, the central server being configured to provide content to each of the plurality of local units (e.g. at the request of a user at a local unit); and at least one earphone device (e.g. a plurality of earphone devices (e.g. each associated with a different user)) linkable to each of the plurality of local units to convert an audio signal received from the server system into an audible sound output to a user; wherein the system is configured to: identify a potential unlinking of an earphone device from an output (e.g. audio or visual output) of a local unit (e.g. potential disconnection from an audio output of a local unit in the case that the earphone device is connected to the local unit (e.g. connected to receive an analogue or digital signal from the local unit)); store user-specific data corresponding to a condition of operation of the local unit substantially at the time of the potential unlinking; identify an attempt to link (e.g. re-link or reconnect) the earphone device with an output of a local unit; and retrieve the stored user-specific data.

In this way, a system is provided in which a user accessing content using an earphone device is able to unlink their earphone device from an output of a local unit (e.g. from a display screen of the local unit for displaying a visual component of media content delivered to the local unit) and retrieve stored user-specific data when re-linking the earphone device with the or another local unit. As the local unit may include a plurality of display screens each for associating with a different earphone device, a user may re-link the earphone device with the same local unit but in association with a different display screen (i.e. different output) or with a different local unit. In the context of an in-flight entertainment system this would allow a passenger changing seats to seamlessly retrieve user-specific data at their new seat.

In one embodiment, the user-specific data includes details of a content file (e.g. media content file) accessed at the time of potential unlinking. For example, the user-specific data may include details of a last point of access (e.g. time elapsed in the case of, for example, a movie or audio file).

In one embodiment, the system is configured to retrieve (e.g. from the central server) the content file identified in the user-specific data. In the case of user-specific data including the last point of access (e.g. time elapsed), the system may be further configured to open (e.g. at the local unit or earphone device) the content file at the last point of access (e.g. time elapsed in the case of a movie or audio file). In this way, playback of a media file may resume at the point the potential unlinking was identified by the system.

In another embodiment, the user-specific data may include settings (e.g. user-specified settings) at the time of potential unlinking. The settings may include earphone settings (e.g. settings associated with operation of the earphone device)

The potential unlinking may include at least one of: a pause request; an unlinking request; and the act of disconnecting the earphone device from the local unit to which it is connected (e.g. physically disconnecting electrical connection or switching off wireless connection).

In one embodiment, the user-specific data is stored on the server system (e.g. stored on the central server or a local unit) and associated with a unique identifier (e.g. unique identifier known to the user or stored on the earphone device). For example, the user-specific data may be transferred to the central server in response to the system identifying the potential unlinking. In one embodiment, the unique identifier is assigned in advance of the potential unlinking (e.g. the unique identifier may be pre-associated with the earphone device or with the user) or assigned at the time of the potential unlinking (e.g. associated with the potential unlinking event).

In one embodiment, the system is configured to obtain the unique identifier (e.g. from the earphone device or input by a user) and send a request to the server system (e.g. central server) for user-specific data corresponding to the unique identifier. The request may be sent by the earphone device or local unit associated with the re-link attempt.

In another embodiment, the user-specific data is stored on a memory unit accompanying the earphone device (e.g. a memory unit forming part of the earphone device). For example, the system may be configured to transfer the user-specific data to the earphone device in response to receipt of an unlinking request from a user. In this way, the server system may subsequently retrieve the user-specific data direct from the earphone device (e.g. without the need to send a query to the sever system).

In one embodiment, the system is configured to determine whether the earphone device linked with the local unit was the last earphone device linked to an output of the local unit. In the case of a local unit including multiple display screens, the system may be further configured to determine whether the earphone device linked with the local unit was the last earphone device linked with a specific display screen of the plurality of display screens.

In one embodiment, the system is configured to determine whether the time elapsed since a last link is within a predetermined limit. If the time elapsed exceeds the predetermined limit, the system may be configured to return the local unit to a default configuration (e.g. start position) if it is not already in this configuration.

In one embodiment, the system (e.g. each local unit) includes: means (e.g. a first module or first software code) operative to identify a potential unlinking of an earphone device from an output of a local unit; means (e.g. a second module or second software code) operative to store user-specific data corresponding to a condition of operation of the first local unit substantially at the time of the potential unlinking in such a way that the stored user-specific data is retrievable on a different one of the local units; means (e.g. a third module or third software code) operative to identify an attempt to link the earphone device with an output of a local unit; and means (e.g. fourth module or fourth software code) operative to retrieve stored user-specific data.

In one embodiment the earphone device is connected to the local unit (e.g. connected to receive an audio signal from the local unit).

In one embodiment, each earphone device includes a processor module for allowing two-way digital communication between the earphone device and the server system.

In one embodiment, the or each earphone device is configured to communicate with the local units. For example, the or each earphone device may be configured to communicate indirectly with the central server via a local unit connected between the central sever and the earphone device. In one embodiment the or each earphone device may be configured to allow both direct communication with the central server and communication with the local units.

In the case of a system including a plurality of earphone devices, in one embodiment each earphone device is associated with an identifier for allowing the server system (e.g. central server or a local unit) to direct communications to a selected one of the plurality of earphone devices. The identifier may correspond to the unique identifier as previously defined. In one embodiment, the identifier may be established by the server system (e.g. central server or a local unit) or pre-set in each earphone device.

In one embodiment, digital communication between each earphone device and server system (e.g. central server or a local unit) is achieved over a wired or wireless connection (or a combination thereof).

In one embodiment, each earphone device includes a cable for electrically connecting the earphone device to the server system via an electro-mechanical interface (e.g. a Remote Jack Unit (RJU) located on or near a user's seat and configured to receive a connector on the end of the cable).

In one embodiment, each earphone device includes at least one circumaural or supra-aural earphone of the type used in headphones or at least one in-ear or in-the-canal earphone. In one embodiment, each earphone device includes a pair (e.g. stereo pair) of earphones. In one embodiment the pair of earphones are connected by a headband to form a pair of headphones.

In one embodiment, the processor module of each earphone device is housed within an earpiece (e.g. cup of a circumaural or supra-aural earphone) of the earphone device or provided as part of the cable connecting the processor module to the server system (e.g. provided as part of an RJU connector forming one end of the cable or at a location along the cable between the RJU connector and earpiece).

In one embodiment, each earphone device is configured to convert digital audio data received from the server system into an analogue sound output.

In one embodiment, the processor module of each earphone device includes a management component configured to receive control data from the server system. In one embodiment, the management component is configured to alter a configuration of the earphone device in response to the received control data.

In one embodiment, the server system is a local system (e.g. with the central server being connected to the plurality of local units via a local connection such as a LAN or WLAN connection). In another embodiment, the server system is a distributed system (e.g. with the central server (which may be one of a plurality of servers) being connected to the plurality of local units via an internet connection).

In one embodiment, each of the plurality of local units is provided in fixed positions (e.g. in fixed proximity to a seat of an aircraft as would be typical in an IFEC system). In the case of local units in a fixed position, this allows continuity of use for a user as they move from one position to another. However, the disclosed embodiments are not limited to situations in which the local units are fixed as the invention more broadly offers users the opportunity to disconnect an earphone device from a first device and re-connect to a second device (e.g. to move from a first type of device to a second type of device). The first and second devices may be in the same or different locations and may be non-fixed in position.

In accordance with a second aspect, there is provided a method (e.g. automated method/computer-implemented method) of delivering media content from a server system to a plurality of devices each linkable with at least one earphone device (e.g. a plurality of earphone devices (e.g. each associated with a different user)) for converting an audio signal received from the server system into an audible sound output to a user, the server system including a central server in communication with a plurality of local units (e.g. each including a display screen for displaying a visual component of media content delivered to the local unit) each acting as a client to the central server, the central server being configured to provide content to each of the plurality of local units, the method including: identifying a potential unlinking of an earphone device from an output of a local unit (e.g. potential disconnection from an audio output of a local unit in the case that the earphone device is connected to the local unit (e.g. connected to receive an analogue/digital audio signal from the local unit)); storing user-specific data corresponding to a condition of operation of the local unit substantially at the time of the potential unlinking; identifying an attempt to link (e.g. re-link or reconnect) the earphone device with an output of a local unit; and retrieving the stored user-specific data.

In one embodiment, the step of identifying the potential unlinking of an earphone device includes identifying a potential unlinking of an earphone device from a first local unit and the step of identifying an attempt to re-link the earphone device with a second local unit.

In another embodiment, the local unit includes a plurality of display screens each for associating with a different earphone device and the step of identifying the potential unlinking of an earphone device includes unlinking from a first display screen and identifying an attempt to re-link the earphone device occur at the same local unit at a second display device of the local unit.

In one embodiment, the user-specific data includes details of a content file (e.g. media content file) accessed at the time of potential unlinking. For example, the user-specific data may include details of a last point of access (e.g. time elapsed in the case of, for example, a movie or audio file).

In one embodiment, the method further includes retrieving (e.g. from the central server) the content file identified in the user-specific data. In the case of user-specific data including the last point of access (e.g. time elapsed), the method may further include opening (e.g. at the local unit or earphone device) the content file at the last point of access (e.g. time elapsed in the case of a movie or audio file). In this way, playback of a media file may resume at the point the potential unlinking was identified by the system.

In another embodiment, the user-specific data may include settings (e.g. user-specific settings) at the time of potential unlinking. The settings may include earphone settings (e.g. settings associated with operation of the earphone device)

The potential unlinking may include at least one of: a pause request; an unlinking request; and the act of disconnecting the earphone device from the local unit to which it is connected (e.g. physically disconnecting electrical connection or switching off wireless connection).

In one embodiment, the user-specific data is stored on the server system (e.g. stored on the central server or a local unit) and associated with a unique identifier (e.g. unique identifier known to the user or stored on the earphone device). For example, the user-specific data may be transferred to the central server in response to identifying the potential unlinking. In one embodiment, the unique identifier is assigned in advance of the potential unlinking (e.g. the unique identifier may be pre-associated with the earphone device or with the user) or assigned at the time of the potential unlinking (e.g. associated with the potential unlinking event).

In one embodiment, the step of retrieving the user-specific data includes obtaining the unique identifier (e.g. from the earphone device or input by a user) and sending a request to the server system (e.g. central server) for user-specific data corresponding to the unique identifier. The request may be send by the earphone device or local unit associated with the re-link attempt.

In a further embodiment, user-specific data is stored on a memory unit accompanying the earphone device (e.g. a memory unit forming part of the earphone device). For example, the user-specific data may be transferred to the earphone device in response to an unlinking request.

In one embodiment, the step of retrieving the stored user-specific data includes obtaining the user-specific data from the memory unit.

In one embodiment, the step of identifying an attempt to re-link the earphone device includes determining whether the earphone device linked with the local unit was the last earphone device linked to an output of the local unit. In the case of a local unit including multiple display screens, the step may further include determining whether the earphone device linked with the local unit was the last earphone device linked with a specific display screen of the plurality of display screens.

In one embodiment, the method further includes determining whether the time elapsed since a last link is within a predetermined limit. If the time elapsed exceeds the predetermined limit, the method may further include returning the local unit to a default configuration (e.g. start position) if it is not already in this configuration.

In one embodiment, the server system is a local system (e.g. with the central server being connected to the plurality of local units via a local connection such as a LAN or WLAN connection). In another embodiment, the server system is a distributed system (e.g. with the central server (which may be one of a plurality of servers) being connected to the plurality of local units via an internet connection).

In one embodiment, each of the plurality of local units is provided in fixed positions (e.g. in fixed proximity to a seat of an aircraft as would be typical in an IFEC system).

In one embodiment, the method provides a user with the opportunity to disconnect an earphone device from a first device and re-connect to a second device (e.g. to move from a first type of device to a second type of device). The first and second devices may be in the same or different locations and may be non-fixed in position.

DETAILED DESCRIPTION

Figure 1:
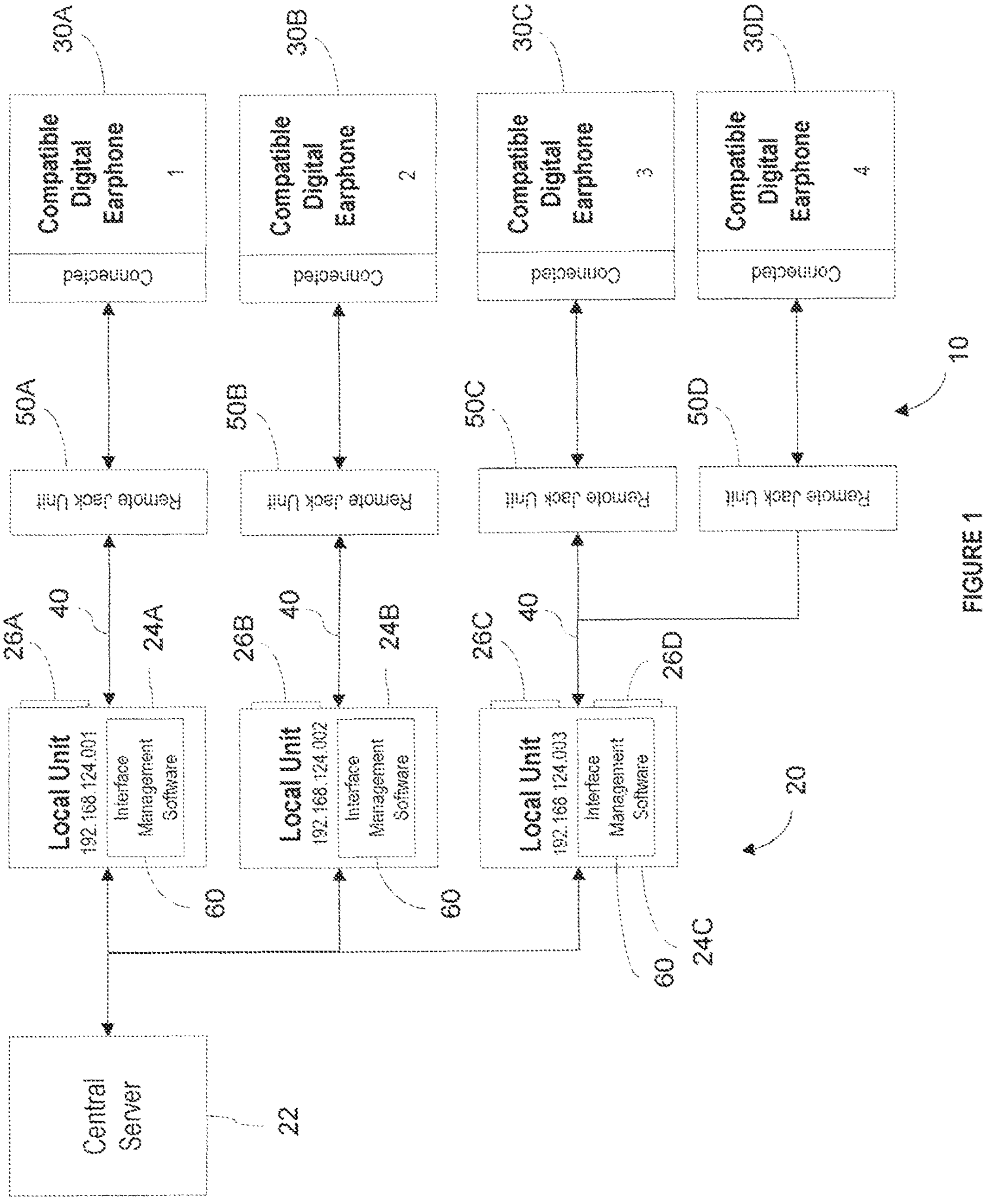
FIG. 1 is a schematic illustration of an IFEC system in accordance with one embodiment.

FIG. 1 shows an IFEC system 10 for providing media and/or communications data to a plurality of passengers on board an aircraft. IFEC system 10 includes a server system (or media source) 20 for supplying media data to a plurality of users. The media data includes audio data supplied to the users by a plurality of pairs of digital headphones (or digital headsets) 30A-D (forming part of a group of headphones 30A-x) each coupled to the server system 20 by a wired digital communications link 40 via a respective RJU 50A-D (part of a group of RJUs 50A-x) mounted in an armrest of a passenger's seat or in another position in the vicinity of the passenger's seat. Each pair of digital headphones 30A-D includes a programmable processor module configured to allow two-way digital communication with server system 20 over digital communications link 40 in accordance with the applicant's earlier published application WO 2013/143971 the entire contents of which are hereby incorporated by reference.

Server system 20 includes a central server 22 in communication with a plurality of local units 24A-C (forming part of a group of local units 24A-x) acting as clients to central server 22. Each of local units 24A, 24B is connected to a respective RJU 50A, 50B and includes a respective display screen 26A, 26B for displaying a visual component of media content delivered to the local unit. As illustrated, local unit 24C is connected to a pair of RJUs 50C, 50D to provide two separate audio outputs and includes a pair of display screens 26C, 26D to provide two separate visual outputs.

In accordance with one example, each local unit 24A-C includes an Interface Management Software module 60 including software code operative to: a) identify a potential unlinking of a digital headphone 30A-D from an output of local unit 24A-D (e.g. potential disconnection of a digital headphones 30A-D from an RJU 50A-D associated with the respective local unit 24A-C); b) store user-specific data corresponding to a condition of operation of the respective local unit 24A-C substantially at the time of the potential unlinking; d) identify an attempt to re-link (e.g. reconnect) a digital headphone 30A-D with a respective RJU 50A-D; and d) retrieve the stored user-specific data. Each local unit 24A-C may include a processor and a non-transitory memory (e.g., a computer-readable storage medium) coupled to the processor and on which the module 60, software code thereof, and/or instructions thereof may be stored. Each local unit 24A-C may be connected to the server system 20 via a network.

Figure 2A:
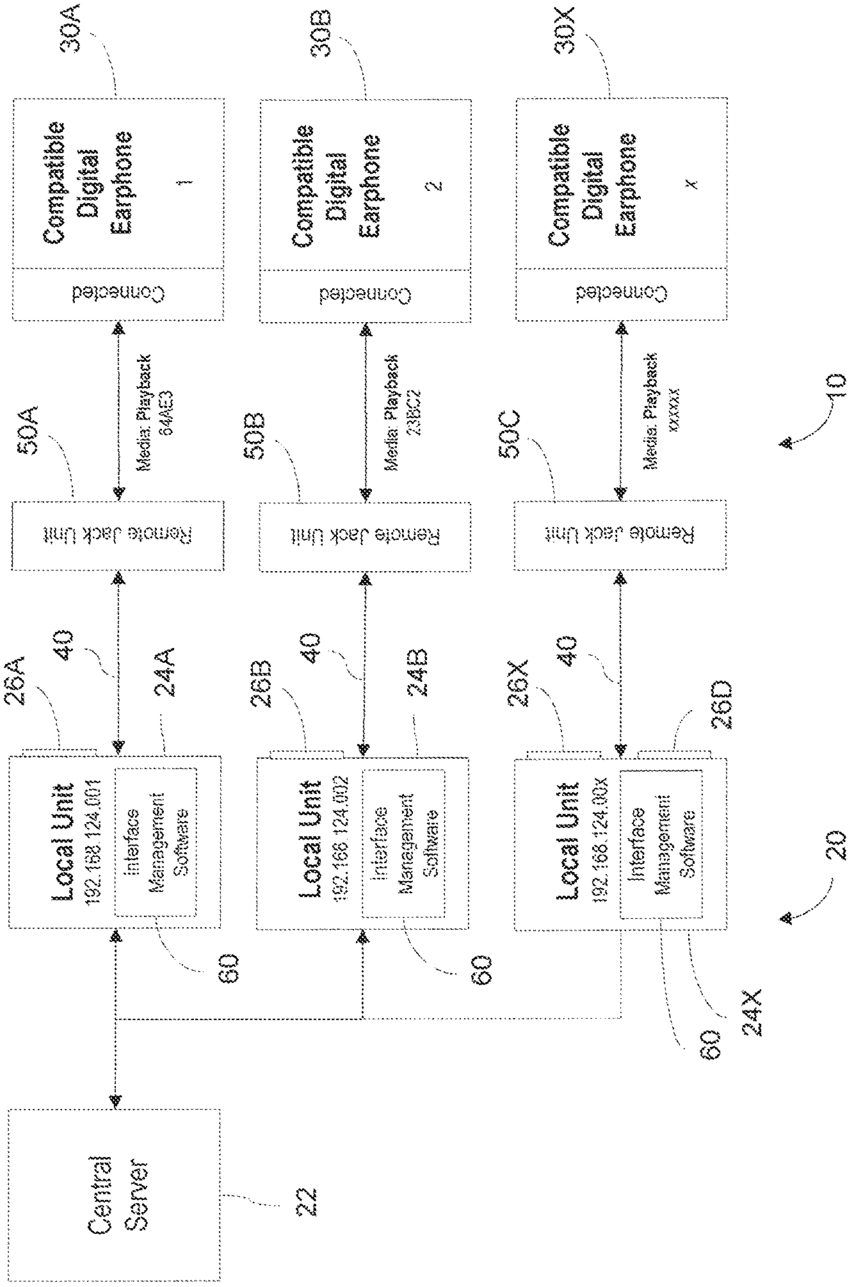
FIG. 2A is a schematic illustration of the IFEC system of FIG. 1 prior to an unlinking event.
Figure 2B:
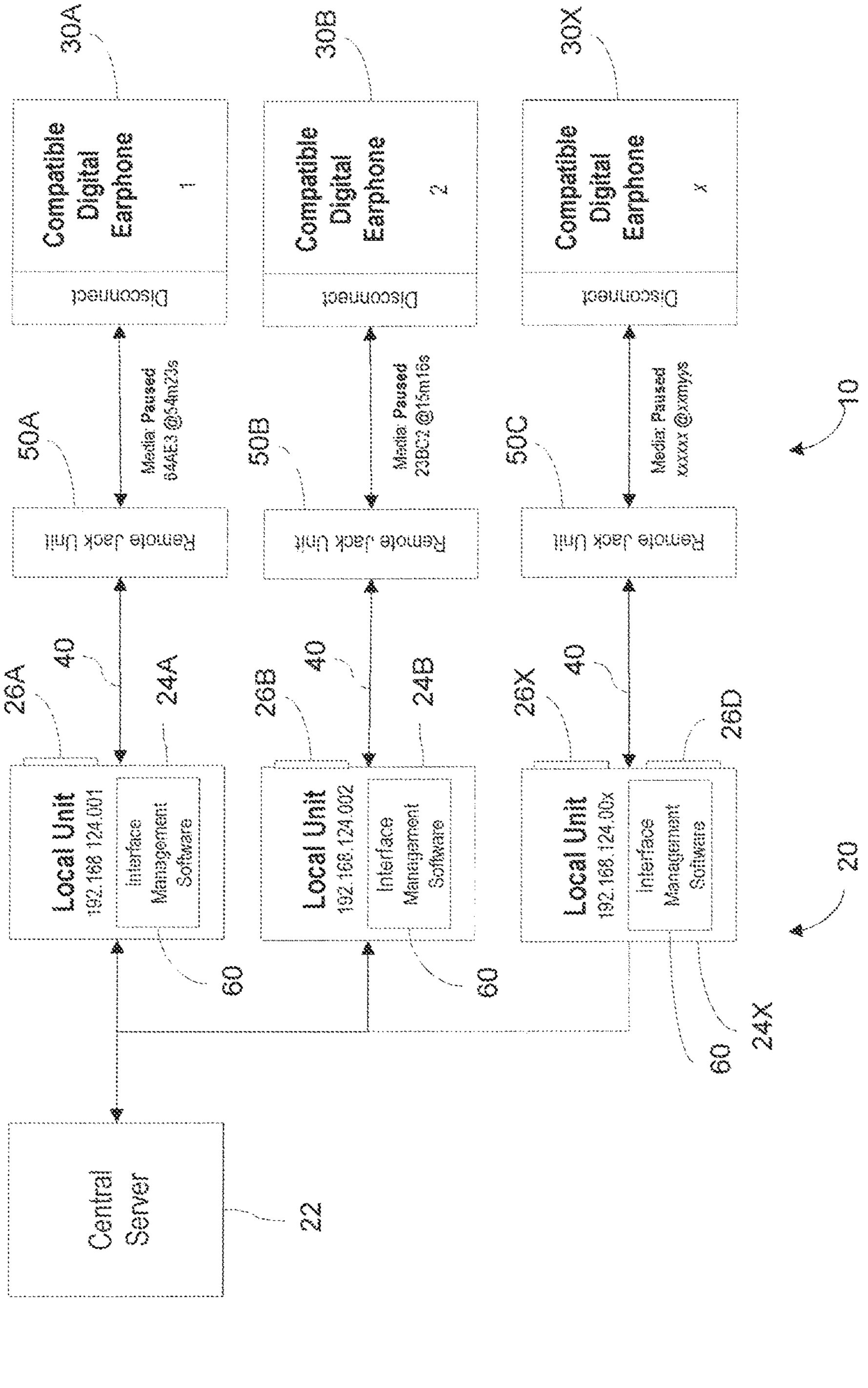
FIG. 2B is a schematic illustration of the IFEC system of FIG. 1 after an unlinking event.
Figure 2C:
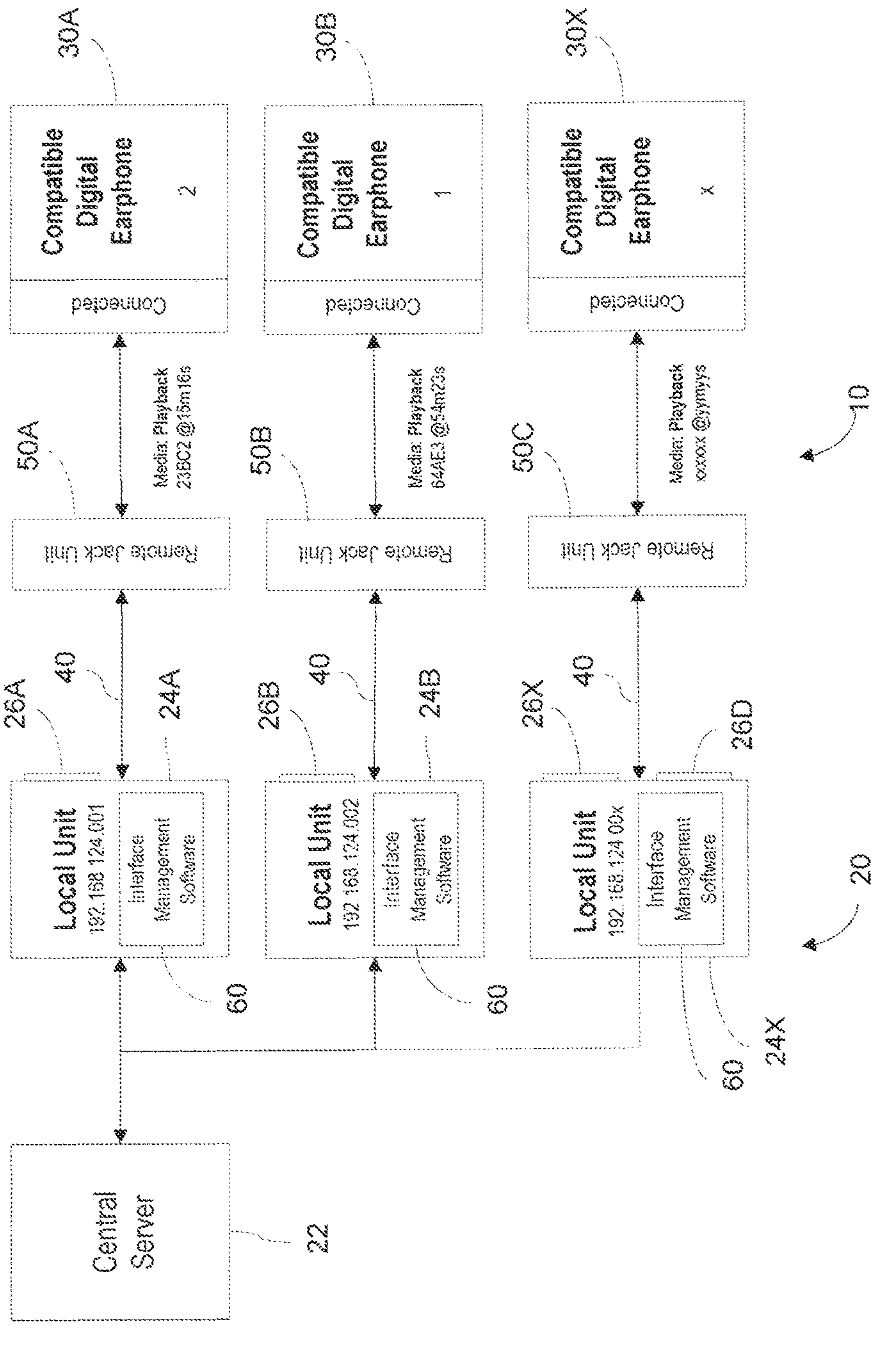
FIG. 2C is a schematic illustration of the IFEC system of FIG. 1 after a re-linking event.
Figure 3:
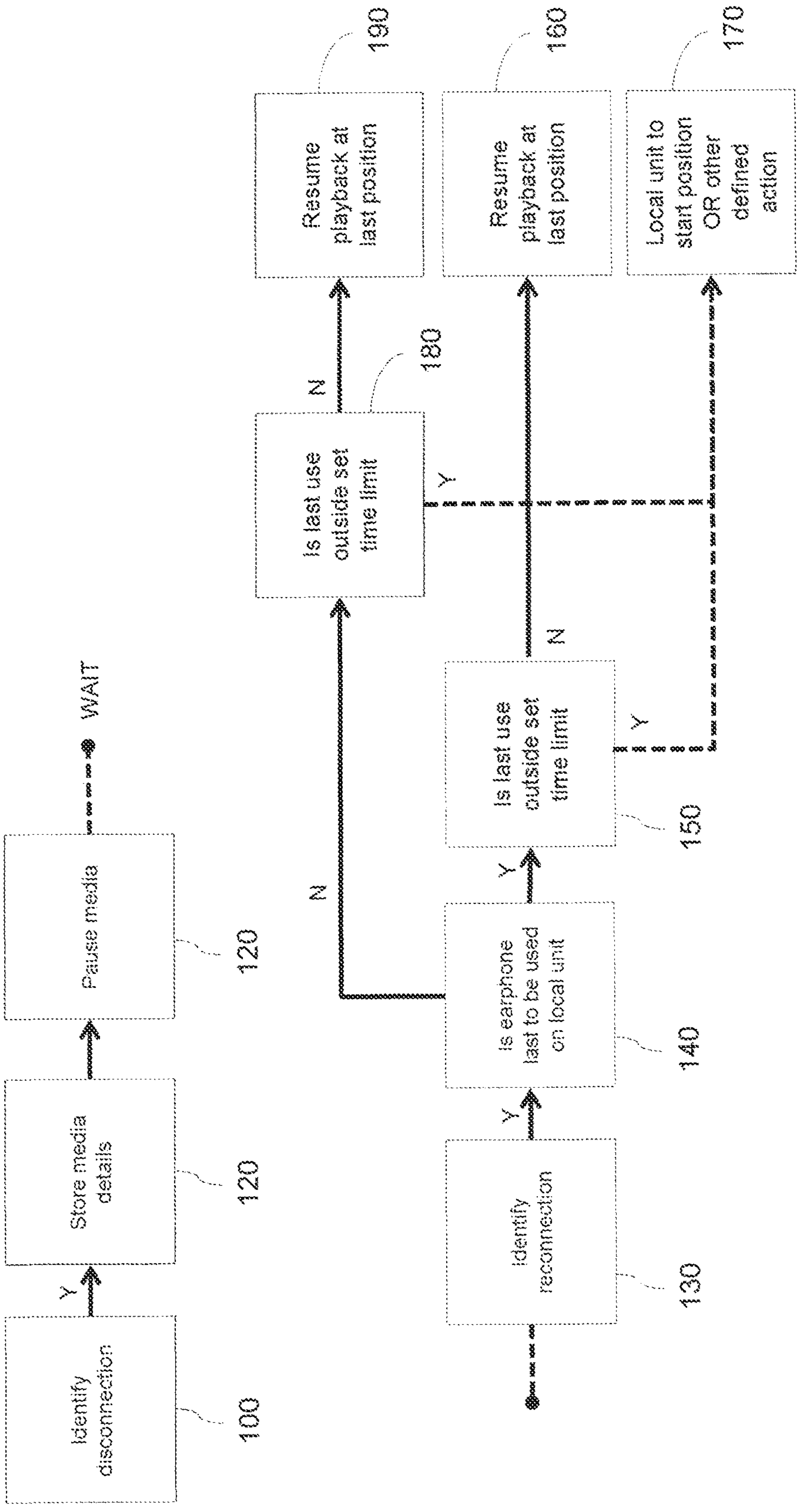
FIG. 3 is a flow chart showing steps in the method of operation of the IFEC system of FIG. 1.

FIGS. 2A-C illustrate in combination with FIG. 3 operation of IFEC system 10 in accordance with one embodiment.

FIG. 2A shows IFEC system 10 prior to a potential unlinking event with digital headphone 30A associated with a first user connected to local unit 24A via RJU 50A to allow playback of a first media file 64AE3 (which may include both audio provided through the digital headphones and a visual component provided through display screen 26A). At the same time, digital headphone 30B associated with a second user is connected to local unit 24B via RJU 50B to allow playback of a second media file 23BC2.

In FIG. 2B digital headphones 30A, 30B are each disconnected from RJUs 50A, 50B with each disconnection being identified (step 100 in FIG. 3) by Interface Management Software module 60 of respective local units 24A, 24B as a potential unlinking event. The potential unlinking event may be identified by the Interface Management Software module 60 in response to at least one of: a pause request (e.g. a user pausing the content); an unlinking request (a user explicitly requesting unlinking from the RJU); and the act of disconnecting the digital headphones from the RJU to which it is connected (e.g. by use of a sensor for detecting electrical disconnection of the digital headphones from the RJU).

In response to the identification of a potential unlinking event, each Interface Management Software module 60 stores (step 110) user-specific data corresponding to a condition of operation of its respective local unit 24A, 24B substantially at the time of the potential unlinking. In this example, the user-specific data that is stored includes details of the first and second media files being played together with the time elapsed at the time of identifying the potential unlinking event. The user-specific data also includes the time of the potential unlinking event. In another embodiment, the user-specific data may include settings (e.g. user-specific settings) at the time of potential unlinking. If the content being played has not already been paused, Interface Management Software module 60 will pause the content (step 120).

In one embodiment, Interface Management Software module 60 transfers the user-specific data to a memory unit associated with digital headphones 30A, 30B. In another embodiment, Interface Management Software module 60 transfers the user-specific data to central server 22 where the data is stored in association with a unique identifier. In one embodiment, the unique identifier is assigned in advance of the potential unlinking event (e.g. the unique identifier may be pre-associated with the earphone device or with the user) or assigned at the time of the potential unlinking (e.g. associated with the potential unlinking event).

As illustrated in FIG. 2C, the first and second users associated with digital earphones 30A, 30B have swapped seats and reconnected their earphones to server system 20 via RJUs 50B, 50A respectively. Interface Management Software modules 60 associated with local units 26B, 26A identify the attempt to re-connect digital headphone 30A, 30B (step 130) with respective RJUs 50B, 50A (either by use of a sensor for detecting electrical connection of the digital headphones to the RJU or via a relinking request from a user).

Interface Management Software module 60 then checks (step 140) whether the digital headphone 30 linked with the local unit 24 was the last digital headphone linked to the RJU 50 (e.g. by checking a log held locally at the local unit 24).

If the answer is yes, Interface Management Software module 60 determines (step 150) whether the last use is outside a predetermined time limit (e.g. by checking the locally held log). The predetermined time limit may be set to correspond with an expected flight time (i.e. to identify use of the same digital headphone 30 with the same RJU 50 but with a new user). If the last use is within the predetermined time limit Interface Management Software module 60 simply starts replay of the media paused on the local unit 24 (step 160). If the last use is outside the predetermined time period (i.e. indicative of a new passenger in a subsequent flight) local unit is returned to a start position or other defined action (step 170).

If the answer is no, Interface Management Software module 60 retrieves the stored user-specific data associated with the user/digital headphones. In the case that the user-specific data is stored on the digital headphones, this may simply include retrieving the user-specific data from the digital headphone that is reconnected. In the case of user-specific data stored on central server 22, a request is sent to central server 22 for stored user-specific data associated with the unique identifier (which may be provided to the local unit by the user or by the digital headphone). Interface Management Software module 60 determines (step 180) whether the last use is outside a predetermined time limit by checking the time of the potential unlinking stored as part of the user-specific data.

If the last use as indicated by the time of the potential unlinking is outside the predetermined time period (i.e. indicative of a new passenger in a subsequent flight) local unit is returned to a start position or other defined action (step 170). If the last use is within the predetermined time limit Interface Management Software module 60 requests the media file identified in the user-specific data from central server 22 and resumes playback of the media file at the point the potential unlinking was identified by the system (step 190).

The invention claimed is:

1. A system for providing media content/communications data to a plurality of devices, the system comprising:

a server system comprising a central server in communication with a plurality of local units each acting as a client to the central server, the central server being configured to provide content to each of the plurality of local units; and at least one earphone device linkable to each of the plurality of local units to convert an audio signal received from the server system into an audible sound output to a user;

wherein the system is configured to:

identify a potential unlinking of an earphone device from an output of a respective local unit of the plurality of local units;

store user-specific data corresponding to a condition of operation of the respective local unit substantially at the time of the potential unlinking;

identify an attempt to link the earphone device with an output of one of the plurality of local units; and retrieve the stored user-specific data.

2. A system according to claim 1, wherein the user-specific data comprises details of a content file accessed at the time of the potential unlinking.

3. A system according to claim 2, wherein the user-specific data includes details of a last point of access.

4. A system according to claim 3, wherein the system is configured to retrieve the content file identified in the user-specific data.

5. A system according to claim 4, wherein the system is further configured to open the content file at the last point of access.

6. A system according to claim 1, wherein the user-specific data is stored on the server system and associated with a unique identifier.

7. A system according to claim 6, wherein the system is configured to obtain the unique identifier and send a request to the server system for user-specific data corresponding to the unique identifier.

8. A system according to claim 1, wherein the user-specific data is stored on a memory unit accompanying the earphone device.

9. A system according to claim 1, wherein the system is configured to determine whether the earphone device linked with the local unit was the last earphone device linked to an output of the local unit.

10. A system according to claim 1, wherein the system is configured to determine whether the time elapsed since a last link is within a predetermined limit.

11. A system according to claim 10, wherein if the time elapsed exceeds the predetermined limit, the system is configured to return the local unit to a default configuration if it is not already in the default configuration.

12. A system according to claim 1, wherein the at least one earphone device comprises a processor module for allowing two-way digital communication between the earphone device and the server system.

13. A method of delivering media content from a server system to a plurality of devices each linkable with at least one earphone device for converting an audio signal received from the server system into an audible sound output to a user, the server system comprising a central server in communication with a plurality of local units each acting as a client to the central server, the central server being configured to provide content to each of the plurality of local units, the method comprising:

identifying a potential unlinking of an earphone device from an output of a respective local unit of the plurality of local units;

storing user-specific data corresponding to a condition of operation of the respective local unit substantially at the time of the potential unlinking;

identifying an attempt to link the earphone device with an output of one of the plurality of local units; and retrieving the stored user-specific data.

14. A method according to claim 13, wherein the step of identifying the potential unlinking of an earphone device comprises identifying a potential unlinking of an earphone device from a first local unit and the step of identifying an attempt to re-link the earphone device with a second local unit.

15. A method according to claim 13, wherein the local unit comprises a plurality of display screens each for associating with a different earphone device and the step of identifying the potential unlinking of an earphone device comprises unlinking from a first display screen and identifying an attempt to re-link the earphone device occur at the same local unit at a second display device of the local unit.

16. A method according to claim 13, wherein the user-specific data comprises details of a content file accessed at the time of potential unlinking.

17. A method according to claim 16, wherein the user-specific data includes details of a last point of access.

18. A method according to claim 17, wherein the method further comprises retrieving the content file identified in the user-specific data.

19. A method according to claim 18, wherein the method further comprises opening the content file at the last point of access.

20. A method according to claim 13, wherein the user-specific data is stored on the server system and associated with a unique identifier.

21. A method according to claim 20, wherein the step of retrieving the user-specific data comprises obtaining the unique identifier and sending a request to the server system for user-specific data corresponding to the unique identifier.

22. A method according to claim 13, wherein user-specific data is stored on a memory unit accompanying the earphone device.

23. A method according to claim 13, wherein the step of identifying an attempt to re-link the earphone device comprises determining whether the earphone device linked with the local unit was the last earphone device linked to an output of the local unit.

24. A method according to claim 13, wherein the method further comprises determining whether the time elapsed since a last link is within a predetermined limit.

25. A method according to claim 24, wherein if the time elapsed exceeds the predetermined limit, the method further comprises returning the local unit to a default configuration if it is not already in this configuration.

* * * * *